United States Patent
Calame et al.

[11] 3,962,977
[45] June 15, 1976

[54] GRATE BAR CASTING FOR INCINERATOR OR OTHER CONVEYOR

[75] Inventors: Tracy C. Calame, Godfrey; William A. Cannon, Alton, both of Ill.

[73] Assignee: Illinois Stoker Company, Alton, Ill.

[22] Filed: Dec. 23, 1974

[21] Appl. No.: 535,961

[52] U.S. Cl. .............................. 110/38; 110/40 R; 432/137
[51] Int. Cl.² ......................................... F23B 1/22
[58] Field of Search ................. 110/38, 40 R, 40 A; 266/21; 432/137

[56] References Cited
UNITED STATES PATENTS

| | | | |
|---|---|---|---|
| 1,722,344 | 7/1929 | Shallock | 266/21 |
| 1,756,037 | 4/1930 | Shallock | 266/21 |
| 3,169,498 | 2/1965 | Rivers | 110/40 X |
| 3,198,146 | 8/1965 | Simpson | 110/40 |

FOREIGN PATENTS OR APPLICATIONS

| | | | |
|---|---|---|---|
| 253,971 | 6/1926 | United Kingdom | 110/40 |

*Primary Examiner*—Kenneth W. Sprague
*Attorney, Agent, or Firm*—Paul M. Denk

[57] ABSTRACT

In a grate bar for use in supporting grate keys, a casting of high carbon steel is formed having a web portion and integral upper and lower flanges therewith, and a series of gussets and end plates to provide the structure for strengthening and securement of the grate bar to the drive link and slide block customarily found in an incinerator or conveyor. The upper flange of the grate bar incorporates a slot to facilitate the insertion and mounting of the various keys while the arranged gussets are formed having a reduced dimension proximate their upper portions to provide clearance for the lateral shift of the keys during their installation. The entire grate bar, and generally its web and flange portions are designed having a tapered shape when viewed in cross section, with the thickest portion of these bar components being located at the juncture between the web and the lower flange to withstand the maximum stress that is usually generated and focused at this location in a grate bar.

9 Claims, 7 Drawing Figures

GRATE BAR CASTING FOR INCINERATOR OR OTHER CONVEYOR

BACKGROUND OF THE INVENTION

This invention relates generally to lateral support in a conveyor, and more particularly to an improved grate bar for use in supporting heavy loads during operation of an incinerator.

In the art of incineration, or heavy conveyance, there is usually included a metallic surface formed of a series of spaced grate bars that support various style of clips, links, or keys, as they are variously known in the trade, and which form the conveying surface. For example, the U.S. Pat. No. 3,169,498, upon a traveling grate incinerator, the usual style of incinerator construction is shown therein, and also discloses the standard form of I-beam shaped grate bar that customarily is utilized for supporting the various style of clips or links forming the combustible material supporting surface. As shown in this prior United States patent, the standard style of grate bar generally used in the usual incinerator design comprises the standard I-beam, that works well as a supportive structure for some period of time until it encounters fatigue due to its prolonged exposure to both heat and excessive weight. One of the early style of grate bars is shown in U.S. Pat. No. 1,939,164, upon the invention of William M. Duncan, relating to Chain Grates Stoker, which patent had been owned by a common assignee to this present application, wherein the standard form of I-beams were generally shown as forming the transverse bar support for the grate surface. The present invention recognizes the value of utilizing the style of transverse support provided by I-beams in stokers or incinerators of the prior art, and particularly an I-beam that may be designed having thickened portions in its flanges to insure adequate strength at the location where maximum strength is encountered and fatigue is likely to be located.

The present invention is designed to improve upon the style of transverse grate bar support as originally contemplated in the aforesaid Duncan patent, and through engineering design generated through a study of grate bar functioning in practical application, particularly as used in incineration, has lead to the conception and development of the style of grate bar described and claimed as the present invention.

It is therefore, the principal object of this invention to provide a grate bar which has been specially designed incorporating enhanced structural support at those locations where maximum stress is encountered by such a bar during practical application.

A further object of this invention is to provide a grate bar which has designed taper provided in its integral web and flanges so as to insure maximum thickness to these components at the location where maximum stress is encountered, particularly where the web joins with the lower flange of said bar, where the greatest bending moments exist.

A further object of this invention is to provide for the arrangement of a series of gussets integrally of and cast in association with the structure of the invention so as to further insure enhanced strength and prolonged life to such a grate bar during sustained usage.

A further object of this invention is to provide a grate bar that is designed to facilitate the insertion and mounting of its clips and links during assembly in fabrication of the conveyor surface.

An additional object of this invention is to provide a grate bar having integral end plates to facilitate the assembly and mounting of the bar to its drive links and associated slide blocks.

Another object of this invention is to provide a grate bar that can be totally formed as a steel casting having enhanced strength due to its high carbon content.

A further object of the invention is to provide a grate bar that can be easily installed, or replaced, in a traveling grate of an incinerator, while yet being inexpensive of manufacture due to its integral formation through the steel casting process.

These and other objects will become more apparent to those skilled in the art upon reviewing the summary of the invention, and analyzing the description of the preferred embodiment in view of its drawings.

SUMMARY OF THE INVENTION

This invention contemplates an improved style of grate bar for use in, particularly, the refuse conveying surface of an incinerator, wherein the bar has been designed having tapering components to furnish thickened areas at that location where maximum bending stress is encountered during usage. Obviously, when a grate bar of the style of this invention is utilized in an incinerator, and when the weight of the grate clips and keys, in addition to the voluminous combustible debris, are imposed thereon it provides, particularly, a point of maximum stress in the category of tension proximate its downward regions particularly where the web of the bar joins with its bottom or lower flange. Hence, to prolong the life of this style of grate bar, and to delay its fatigue, or even shearing, the bar of this invention is designed having more metal cast particularly at this juncture between its web and bottom flange.

As previously analyzed, the grate bar of this invention provides a modification to the standard style of I-beam customarily and routinely utilized in this type of structure, wherein this novel bar is formed having integrally an upper and lower flange, with a series of arranged gussets formed approximately at its midpoint to insure resistance to any weight deposited thereon. In addition, integrally cast laterally of the grate bar are a pair of end plates that not only insure resistance against shearing at these locations, but also provide the means for mounting of the entire grate bar to its driving link and accompanying slide block. Furthermore, it is of advantage to provide means for quickly replacing any grate key forming the surface of the incinerator conveyor, and to insure this, the upper flange of the grate bar is designed having a slot that allows application of the specially designed keys, as normally used in this industry, for forming a traveling grate surface, and which allows for rapid lateral shifting of a series of the same during their installation in forming the grate surface. Furthermore, the previously mentioned gussets are provided having particularly designed reduced heights proximate their upper locations so as to provide clearance during shifting of the keys to either side of the grate bar during assembly.

The unique feature of this invention is the integral formation of this entire grate bar in one operation, and particularly, the assembly is achieved as a steel casting, preferably forming all of the components of the bar in one function. Desirably, the grate bar is cast of a high carbon steel, one that exhibits a carbon content between about 0.4 to 0.5 percent, more or less, of the steel alloy. A grate bar formed of this type of material and having the configuration and shape herein summarized has been tested for both endurance and strength. For endurance purposes, experimental models utilized in actual tests have continuously worked satisfactory for prolonged period of time far in excess of the standard type of I-beam form of grate bar heretofore employed in an incinerator surface. It should be understood, though, that the bar of this invention can be cast from other steel alloys available in the trade, such as, for example, carbon alloy steel, or even on occasion stainless steel.

Strengthwise, force tests conducted upon the grate bar of this invention in comparison with the standard form of heavy I-beam grate bar heretofore utilized in earlier model incinerators have shown that this invention increases the strength of the component by at least 48% in its resistance to bending about the horizontal, or $x$ axis, while its resistance to bending about the vertical, or $y$ axis, is approximately 220% greater. Tests were conducted upon a casting that had an upper web dimension of about ¼ inch in thickness, while its lower section or that region where the web integrally is cast into the lower flange had a thickness of approximately ⅜ inch. Other dimensions of these test bars, particularly the inventive bar, were that the upper flange had a width of 2.5 inches, the lower flange had a width of 4 inches, while the heighth of the bar was 3 inches. In conducting both shear and stress tests in comparing the inventive bar with the heavy roller I-beam, and the light roller I-beam, the yield point of the inventive bar was approximately 35,000 pounds of force, providing resistance to stress up to 49,000 psi. The yield point of the heavy rolled I-beam was only 15,000 pounds of force, exhibiting a resistance to stress of 31,000 psi. The light roller I-beam subjected to the same tests produced results approximately 86% of the results attained upon testing of the heavy rolled I-beam.

Obviously other dimensions for the grate bar of the invention are contemplated and can be used, the disclosed dimensions being those for the test bar of the experiment performed.

Hence, the 48 percent and 220 percent greater resistance to bending in both the $x$ and $y$ axes of the inventive bar over the prior art type of bars was easily computable, and readily proved the enhanced results to be achieved from the style of grate bar cast in the form of the present invention, over the usual style of rolled I-beam employed and shown in the prior art. Hence, the prolonged endurance and resistance to stress achieved during usage of the present invention is readily determinable through these simple force tests, and exhibit a grate bar of much greater strength when cast in the style of this invention.

BRIEF DESCRIPTION OF THE DRAWINGS

In the drawings, FIG. 1 furnishes a partial perspective view of the operating components of a conveyor, such as an incinerator, disclosing the series of grate bars of this invention in application, with most of the grate keys or clips being removed to provide for exposure of the bars to view.

DESCRIPTION OF THE PREFERRED EMBODIMENT

Figure 1:
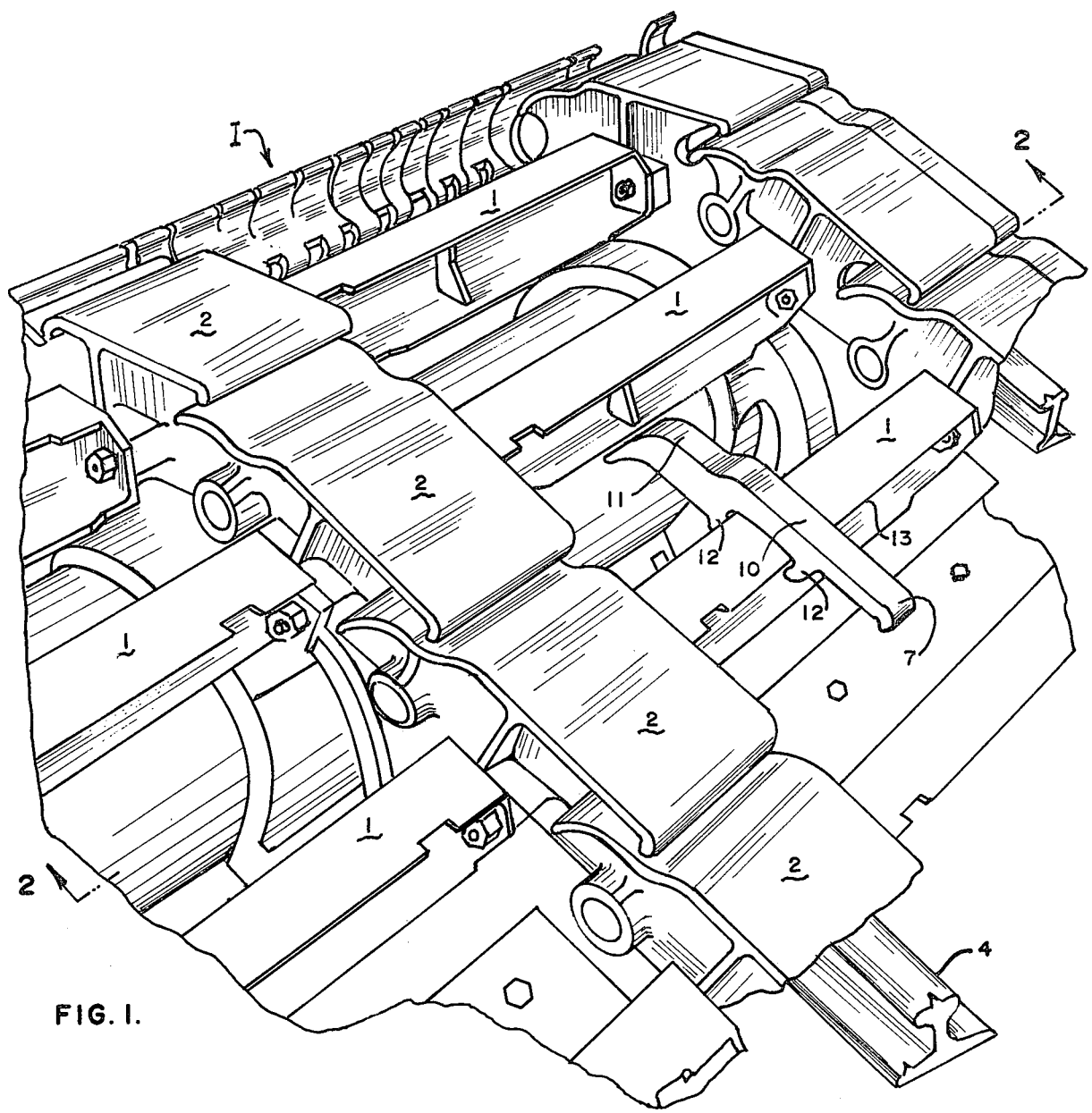
Figure 2:
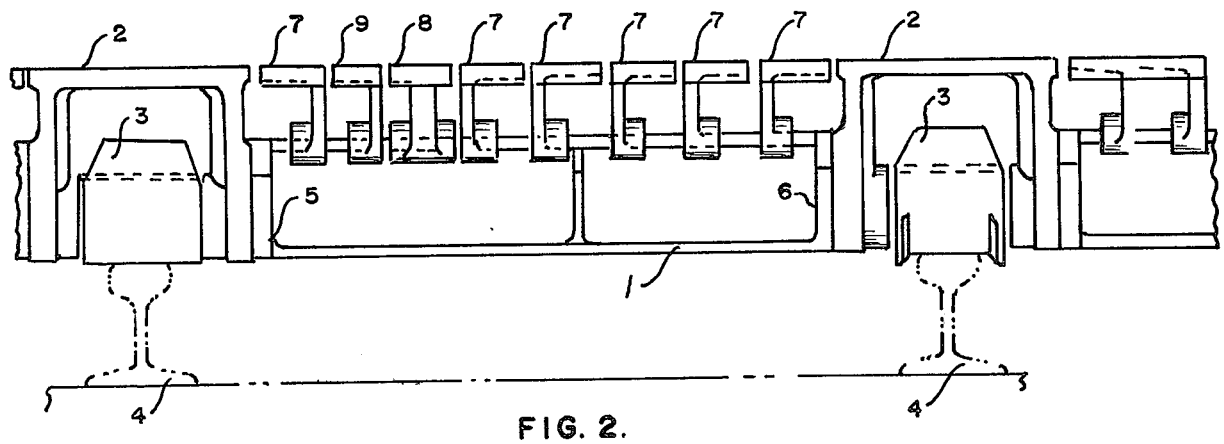
FIG. 2 provides a transverse sectional view of the conveyor taken along the line 2—2 of FIG. 1, but further disclosing the installation of the series of keys as in place upon the grate bar of this invention.

In referring to FIGS. 1 and 2, there is shown, in partial view, the conveyor or the endless belt incinerator I that incorporates the style of grate bar 1 of this invention. Usually, such a conveyor includes a series of drive links 2 that are mounted upon slide blocks 3 that ride upon the upper part of stationary spaced rails 4 as during operation of the traveling grate of the incinerator or conveyor. Hereinafter the apparatus in which this grate bar invention is used will be defined as an incinerator, even though it is just as likely that its application could be made in other forms of conveyors.

As further seen in FIG. 2, the grate bar 1 of this invention is fastened at its two ends, namely by its end plates 5 and 6, directly to the sides of the drive links 2, and in this manner are simultaneously moved along the length of the incinerator during its operation. The prime purpose for the grate bar is to provide support for the various keys, clips, or links, a variety of them as shown mounted upon the bar 1, which links are customarily designed having upwardly arranged planer surfaces to provide a platform like area for the incinerator and upon which the various combustible matter may be deposited during operation. Generally, these keys or links are identified as regular grate links 7, locking links 8, and filler links, as at 9, the principal object of said variety of links being to provide the aforesaid conveying surface. But in addition, it is to be noted that these links usually have some slight spacing disposed between the same and it is through this area that the tuyeres of the incinerator direct their blast of air so as to stimulate the combustion of the debris deposited upon its conveyor.

While the various style of links or keys 7 through 9 utilized in a traveling grate conveyor are constructed of a great variety of structural shapes, the preferred one, as shown at 7 in FIG. 1, provides an upward surface 10 having its frontal portion 11 contoured so as to provide some lapping of these links along the length of the incinerator, and thereby prevent too much of a combustible material from falling therethrough, in addition to providing the means for furnishing a continuous or endless chain of these links in this style of endless conveyor forming the incinerator. As can also be noted from FIG. 1, at the frontal portion of this incinerator the links are turned down to the underside of the incinerator surface for their return back to its other end, thereby providing an endless or continuous belt type of surface. More important with respect to this invention, the bottom of each link includes a pair of clamping components 12 that are turned towards each other and are designed for embracing, in a locking action, the upper flange 13 of the grate bar 1.

Figure 3:
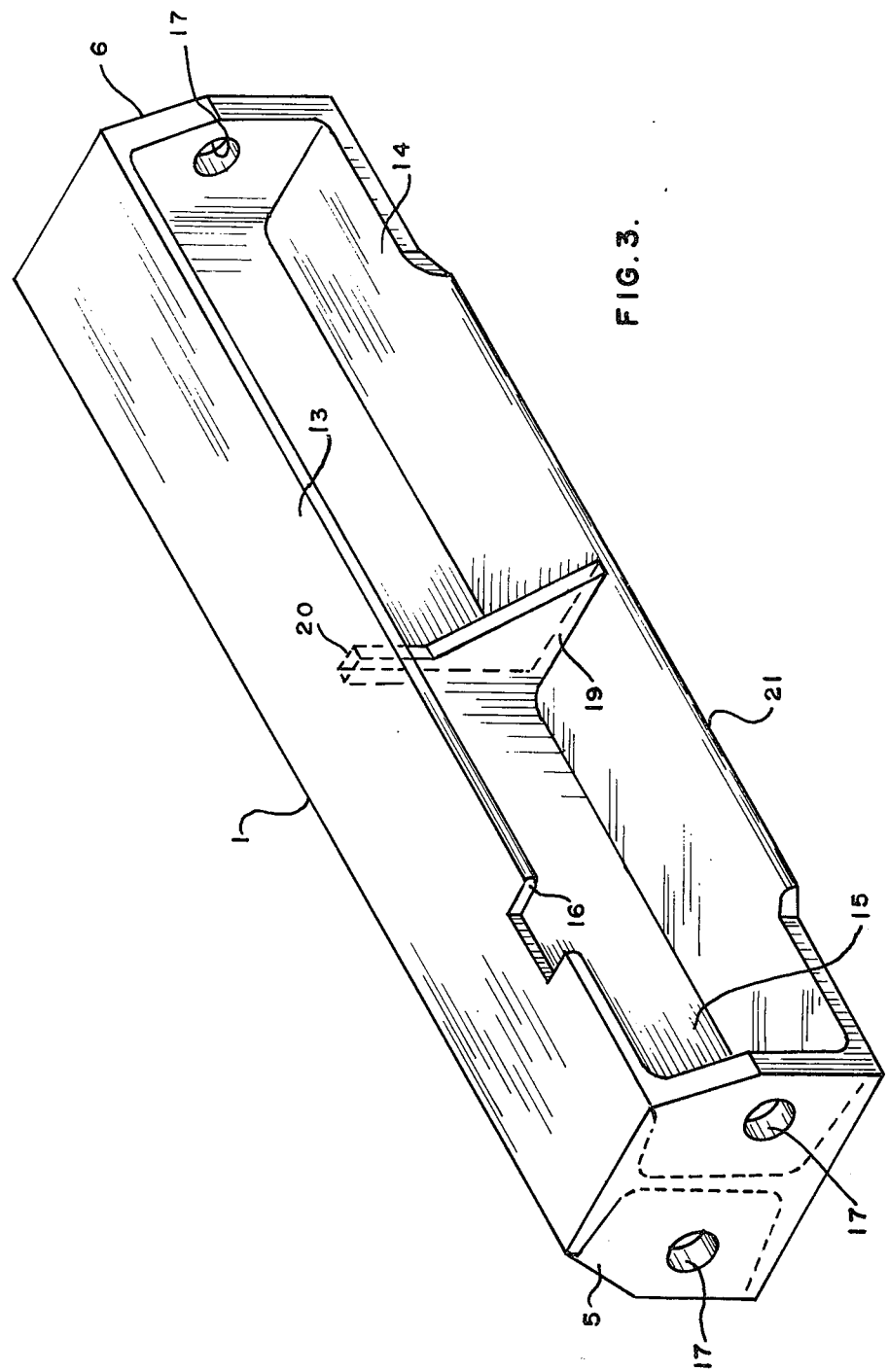
FIG. 3 provides an isometric view of one of the cast grate bars of this invention.
Figure 4:
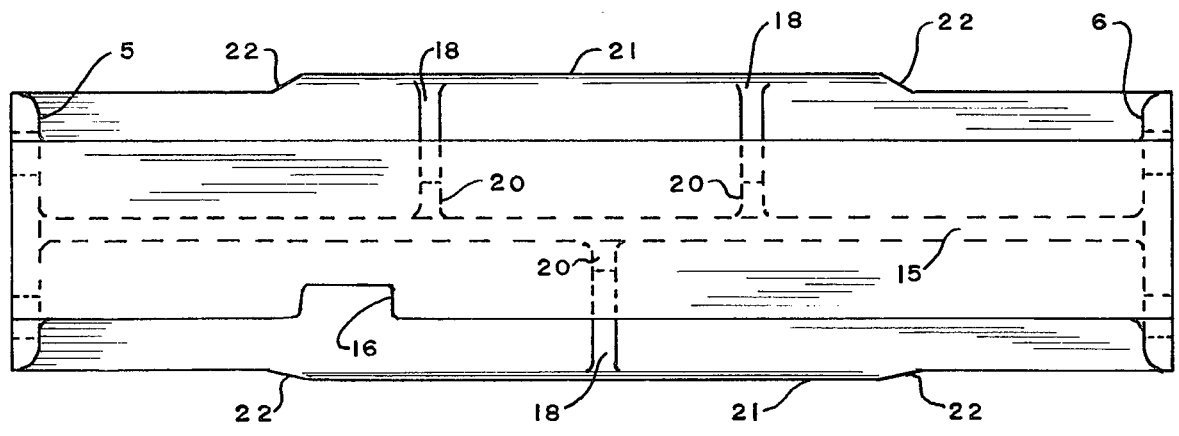
FIG. 4 furnishes a plan view of the grate bar of this invention.
Figure 5:
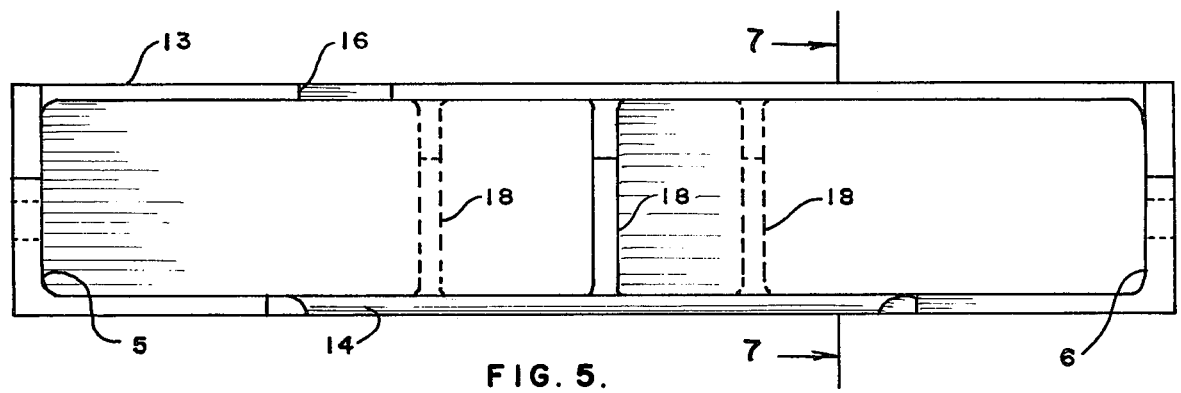
FIG. 5 provides a front view of one of the grate bars of this invention as shown in FIG. 3.
Figure 6:
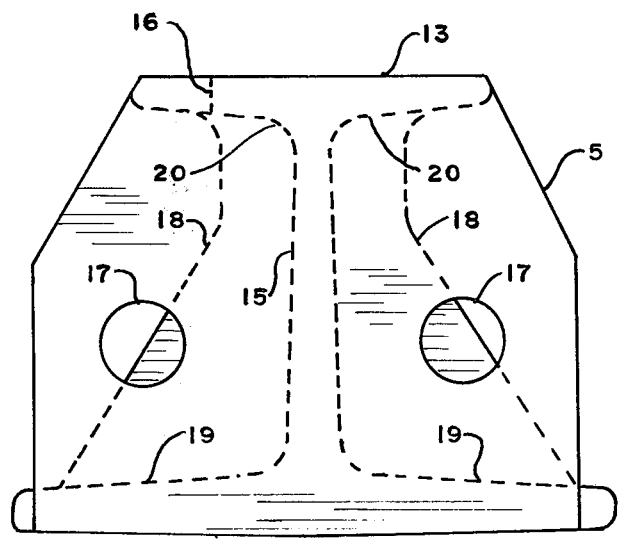
FIG. 6 provides a side view of the grate bar of this invention.

The specific construction of the grate bar 1 of this invention is shown in greater detail in FIGS. 3 through 7. As can be seen in FIG. 3, the grate bar comprises a generally I-beam shaped component having the upper flange 13, a lower flange 14, and an intermediate web 15 extending the spacing between said flanges. The upper flange 13 is provided having a slot 16 extending therein, and it is by means of this slot that the various links 7 through 9, and in particular their clamping members 12, are provided their clearance for insertion into the embracing relationship with respect to this upper flange, so that said links can then be laterally slid during their installation upon the respective grate bar. Obviously, upon viewing the construction of each link 7, as shown in FIG. 1, their clamping members 12 extend in a direction toward each other and are spaced apart a dimension which is less than the width of the upper flaps 13 of a grate bar. But, the slot 14 is provided having a depth sufficient to allow clearance for at least one of the clamping members 12 to pass therethrough, after the other clamping member has already been hooked onto the opposite edge of the bar's upper flange.

Integrally formed and cast into the grate bar of this invention, at either end, are the end plates 5 and 6 which, as can be seen, are integrally joined with both the upper and lower flanges and the web component of the bar. At least a pair of apertures 17 are provided through each end plate to accommodate fastening means for mounting of the bar to the aforesaid drive links. In addition to providing reinforcement for the grate bar at its end locations, and to resist any of the shearing forces thereat, the end plates also provide to limit the extent that the links can be laterally shifted upon the upper flange 13 of the bar as when they are being installed or replaced in the incinerator.

To further insure the rigidity and strength of the grate bar of this invention, there are provided inwardly of the said bar a series of gussets, as at 18, with a singular gusset being provided to one side of the web 15, and with a pair of said gussets being formed to the other side of said web. Obviously, any variety or number of these gussets may be provided along the length of the bar, being cast integrally with its flanges and web, for the purpose of enhancing the strength characteristics of the bar, particularly at those locations where excessive stress and bending moment is encountered due to the excessive weight of any combustible materials continuously being deposited and conveyed along the incinerator. As can be seen, the gussets have a greater length (or width) proximate their downward locations, as at 19, since greater tension is exerted proximate this lower region of the grate bar, with the upper portion of each gusset, as at 20, being of reduced dimension. Furthermore, the length (or width) 20 of the upper part of each gusset is preferably designed having a dimension less than the depth of cut of the slot 16, so that any link inserted onto the upper flange 13 of the bar will have sufficient clearance for its clamping members 12 to bypass each gusset as it is shifted laterally during assembly.

As previously analyzed, the area of greatest pressure encountered by the grate bar is at the location of its lower flange 14, and particularly where the flange joins with the web 15. Hence, it can be seen that the lower flange 14 is provided having greater width proximate its middle segment, as at 21, then it exhibits at its ends, and this widened area is simply achieved through the form of its mold while being cast, having slightly angled edges, as at 22, to provide for this increased width. Furthermore, the lower flange 14 may also have a greater thickness proximate this expanded area, and provide sufficient additional quantity of carbon steel at this location which has been heretofore predetermined through computation to provide the type of strength to resist the tension encountered there.

Figure 7:
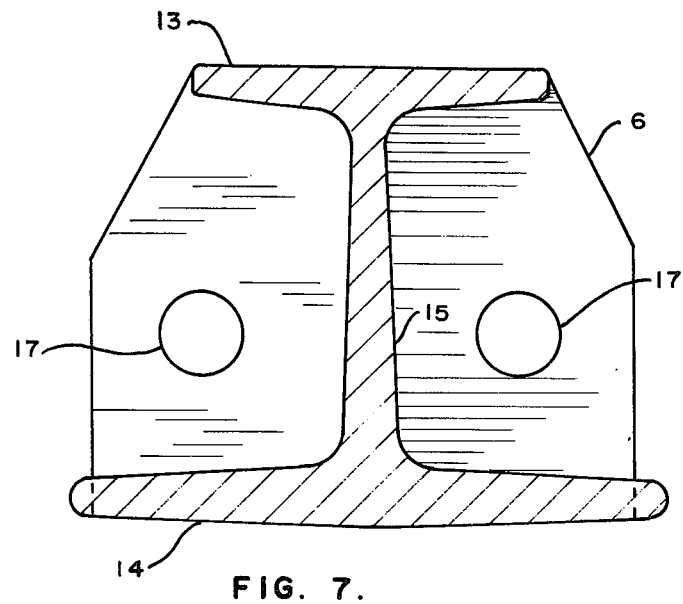
FIG. 7 discloses a sectional view of the grate bar of this invention taken along the line 7—7 of FIG. 5.

A further feature of this invention, and which has been just previously mentioned, is the design of the integral flanges and webs to provide greater thickness at those locations where the greater forces are encountered. As can be seen in FIG. 7, the lower portion of the web 15, where it joins with the lower flange 14, exhibits this greater thickness, which added thickness has been previously calculated to resist more than the weight of the usual loads of material deposited and conveyed by an incinerator, in addition to having the usual factor of safety accommodated for therein. And, it can be seen through this cross section of the bar components that its upper and lower flanges and intermediate web are designed having a tapering thickness, being of reduced thickness at those locations where lesser stresses are encountered, as at the tips of the flanges, and particularly at the tips of the upper flange 13, but that this tapering thickness increases to a culmination at that location where the web 15 joins with the lower flange 14. Furthermore, and as can be seen from FIG. 7, the upper flange 13 is of shorter width dimension than the lower flange 14 that encounters most of the tension and stress during usage.

Various modifications, changes or variations may be considered by those skilled in the art upon reviewing the description of this preferred embodiment. Such changes are intended to fall within the scope of, and be protected by, any claims to patent protection attained herein. The described embodiment is merely illustrative of the principle of casting and use of this grate bar invention.

Having thus described the invention that is claimed and described to be secured by Letters Patent is:

1. An improvement in a grate bar casting for use as a component in a conveyor and of the type for supporting the links forming the conveyor surface and incorporating a length of web having integral upper and lower flanges to support the weight of said conveyor links and any materials deposited thereon, the improvement which comprises at least one gusset connecting integrally with the web and extending the spacing between and connecting to the upper and lower integral flanges to enhance the load bearing attributes of the grate bar, said gussets being disposed inwardly from the ends of said grate bar, with one of said gussets being disposed centrally to one side of the bar web, and a pair of said gussets being arranged off-center to the other side of said bar web.

2. An improvement in a grate bar casting for use as a component in a conveyor and of the type for supporting the links forming the conveyor surface and incorporating a length of web having integral upper and lower flanges to support the weight of said conveyor links and any materials deposited thereon, the improvement which comprises at least one gusset connecting integrally with the web and extending the spacing between and connecting to the upper and lower integral flanges to enhance the load bearing attributes of the grate bar, said gussets being disposed inwardly from the ends of said grate bar, the upper flange of said bar being formed having a slot therethrough, said slot having dimensions to provide clearance for insertion and installation of links onto said grate bar, the upper part of each grate bar and gusset being of reduced dimensions than that part of the gusset disposed therebelow, with said upper part being disposed closer to the bar web than said flange slot to provide clearance for the lateral shifting of any grate links during their installation.

3. An improvement in a grate bar casting for use as a component in a conveyor and of the type for supporting the links forming the conveyor surface and incorporating a length of web having integral upper and lower flanges to support the weight of said conveyor links and any materials deposited thereon, the improvement which comprises at least one gusset connecting integrally with the web and extending the spacing between and connecting to the upper and lower integral flanges to enhance the load bearing attributes of the grate bar, said gussets being disposed inwardly from the ends of said grate bar, end plates securing to each end of the grate bar, said plates having means for facilitating connection of the grate bar to the conveyor, the location of maximum stress encountered by the grate bar during application being centered in the region proximate the juncture between the bar web and its lower flange, said upper and lower flanges and the bar web having tapering dimensions as in cross section with their greatest thickness being located proximate said juncture between the bar web and its lower flange.

4. The invention of claim 3 wherein the lower flange has greater width approximate the center of the grate bar than at its ends.

5. The invention of claim 3 wherein said grate bar is molded from cast steel.

6. The invention of claim 5 wherein the cast steel contains a carbon content between about 0.4 percent to 0.5 percent.

7. An improvement in grate bar casting for use as a component in an incinerator and of the type for supporting the links forming the incinerating surface and incorporating a length of web having integral upper and lowe flanges to support the weight of said links and any materials deposited thereon, the improvement which comprises said bar having the general configuration of an I-beam structure, at least one gusset connecting integrally to each side of the web and extending the spacing between and connecting to its upper and lower integral flanges to enhance the load bearing attributes of the grate bar, said gussets being disposed inwardly from the ends of said grate bar, and end plates securing to each end of the grate bar, said plates having means for facilitating connection of the grate bar to the incinerator.

8. The invention of claim 7 wherein the upper flange of the bar is formed having a slot therethrough, and said slot having dimensions to provide clearance for insertion and installation of links onto said grate bar.

9. The invention of claim 7 wherein said means for facilitating connection includes a pair of apertures formed through each end plate with one of said apertures being disposed to either side of the bar web and being arranged for cooperating with fastening means for securing said bar to the conveyor.

* * * * *